United States Patent
Lee et al.

(10) Patent No.: US 9,491,184 B2
(45) Date of Patent: Nov. 8, 2016

(54) METHOD AND APPARATUS FOR MANAGING TOKENS FOR DIGITAL RIGHTS MANAGEMENT

(75) Inventors: Byung-Rae Lee, Seoul (KR); Sung-Oh Hwang, Yongin-si (KR); Sergey Nikolayevich Seleznev, Suwon-si (KR); Kook-Heui Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 956 days.

(21) Appl. No.: 12/417,958

(22) Filed: Apr. 3, 2009

(65) Prior Publication Data

US 2009/0254983 A1   Oct. 8, 2009

(30) Foreign Application Priority Data

Apr. 4, 2008 (KR) .................. 10-2008-0031896
Jan. 30, 2009 (KR) .................. 10-2009-0007651

(51) Int. Cl.
*G06F 21/00* (2013.01)
*H04L 29/06* (2006.01)
*G06F 21/10* (2013.01)

(52) U.S. Cl.
CPC ............. *H04L 63/123* (2013.01); *G06F 21/10* (2013.01); *H04L 63/0807* (2013.01); *H04L 63/10* (2013.01); *G06F 2221/0706* (2013.01); *H04L 2463/101* (2013.01)

(58) Field of Classification Search
CPC ....................................... G06F 21/10
USPC ............................. 705/50–79, 902
See application file for complete search history.

(56) References Cited

U.S. PATENT DOCUMENTS

| | | | |
|---|---|---|---|
| 5,745,879 A | 4/1998 | Wyman | |
| 7,725,399 B2 | 5/2010 | Nakahara et al. | |
| 7,882,291 B2 | 2/2011 | Oh et al. | |
| 8,646,061 B2 | 2/2014 | Oh et al. | |
| 2004/0268131 A1 | 12/2004 | Kudo et al. | |
| 2005/0216419 A1 | 9/2005 | Lee et al. | |
| 2005/0268098 A1 | 12/2005 | Oh et al. | |
| 2006/0031164 A1 | 2/2006 | Kim | |
| 2006/0059094 A1 | 3/2006 | Oh et al. | |
| 2006/0059103 A1 | 3/2006 | Ebihara et al. | |
| 2006/0059573 A1 | 3/2006 | Jung et al. | |
| 2008/0046271 A1* | 2/2008 | Jeong ............ | G06F 21/10 709/203 |
| 2008/0229387 A1 | 9/2008 | Baks | |

(Continued)

FOREIGN PATENT DOCUMENTS

| | | |
|---|---|---|
| CN | 101089865 A | 12/2007 |
| CN | 101136751 A | 3/2008 |

(Continued)

OTHER PUBLICATIONS

Hidetoshi et al., Standardization of OMA DRM-Technologies for Handling Digital Content Distribution and Copyright Management, NTT DoCoMo Technical Journal, vol. 6, No. 4, Mar. 31, 2005, pp. 43-50, XP008152521.

*Primary Examiner* — James A Reagan
(74) *Attorney, Agent, or Firm* — Jefferson IP Law, LLP

(57) ABSTRACT

A method and apparatus for managing tokens for Digital Rights Management (DRM) in a terminal are provided. In the method, at least one token is acquired from a Rights Issuer (RI), and the token is moved to a Secure Removable Media (SRM) through a token move request message. The token can be shared by several terminals.

21 Claims, 7 Drawing Sheets

(56) References Cited

U.S. PATENT DOCUMENTS

2009/0151006 A1    6/2009  Saeki et al.
2010/0211793 A1*   8/2010  Park .................. H04N 7/162
                                                          713/176

FOREIGN PATENT DOCUMENTS

| | | |
|---|---|---|
| JP | 06-500878 A | 1/1994 |
| JP | 2003-323343 A | 11/2003 |
| JP | 2006-085484 A | 3/2006 |
| JP | 2007-065985 A | 3/2007 |
| JP | 2007-072612 A | 3/2007 |
| JP | 2007110730 A * | 4/2007 ............... H04L 9/08 |
| JP | 2007-529834 A | 10/2007 |
| JP | 2007-529835 A | 10/2007 |
| JP | 2009-510583 A | 3/2009 |
| KR | 10-2006-0082806 A | 7/2006 |
| WO | 2007/036831 A2 | 4/2007 |
| WO | 2007/058439 A1 | 5/2007 |

* cited by examiner

METHOD AND APPARATUS FOR MANAGING TOKENS FOR DIGITAL RIGHTS MANAGEMENT

PRIORITY

This application claims the benefit under 35 U.S.C. §119 (a) of a Korean patent application filed in the Korean Intellectual Property Office on Apr. 4, 2008 and assigned Serial No. 10-2008-0031896, and of a Korean patent application filed in the Korean Intellectual Property Office on Jan. 30, 2009 and assigned Serial No. 10-2009-0007651, the entire disclosures of both of which are hereby incorporated by reference.

BACKGROUND OF THE INVENTION

1. Field of the Invention

The present invention relates to a method and apparatus for managing tokens used to receive broadcast services in a mobile broadcast system. More particularly, the present invention relates to a method and apparatus capable of managing tokens used for Digital. Rights Management (DRM) by means of Secure Removable Media (SRM) in an Open Mobile Alliance (OMA) Broadcast (BCAST) environment.

2. Description of the Related Art

The Open Mobile Alliance (OMA) Broadcast (BCAST) standard defines mobile broadcast technologies. In the OMA BCAST standard, Digital Rights Management (DRM) Profile presents techniques for accessing broadcast services and contents using tokens. Secure Removable Media (SRM) technology proposes a method for using download contents and their associated Rights Objects (RO) in memory cards such as a Multi-Media Card (MMC) and a Secure Digital (SD)-Card.

In the OMA BCAST standard, users purchase tokens to access broadcast services and contents, and the tokens are consumed during playback of the services and contents. The users can purchase tokens in advance and play back their desired services and contents by using the purchased tokens. However, according to the DRM Profile in OMA BCAST v1.0 (DRM Profile is broadcast service/content protection technology based on OMA DRM v2.0), the tokens can be used only in the terminals through which their users first purchased the tokens. Accordingly, there is a need for an apparatus and method for using the tokens in other terminals.

SUMMARY OF THE INVENTION

An aspect of the present invention is to address at least the above-mentioned problems and/or disadvantages and to provide at least the advantages described below. Accordingly, an aspect of the present invention is to provide a method and apparatus for moving, to a Secure Removable Media (SRM), tokens which are in use in Digital Rights Management (DRM) Profile defined by the Open Mobile Alliance (OMA) Broadcast (BCAST) standard, so that the tokens can be used even in other terminals.

In accordance with an aspect of the present invention, a method for managing tokens for Digital Rights Management (DRM) in a terminal is provided. The method includes acquiring at least one token from a Rights Issuer (RI), and moving the token to a Secure Removable Media (SRM) using a token move request message. Accordingly, the token may be shared by several terminals.

In accordance with another aspect of the present invention, a method for managing tokens for Digital Rights Management (DRM) in a terminal is provided. The method includes inserting a Secure Removable Media (SRM), including thereon at least one token acquired from a Rights Issuer (RI) by another terminal, into the terminal, and acquiring the at least one token from the SRM. Accordingly, the token can be shared by several terminals.

In accordance with further another aspect of the present invention, a method for managing tokens for Digital Rights Management (DRM) in a Secure Removable Media (SRM) is provided. The method includes requesting at least one token, acquired by a first terminal from a Rights Issuer (RI), from the first terminal using a token move request message, and acquiring the at least one token from the first terminal. Accordingly, the token can be shared by several terminals.

In accordance with yet another aspect of the present invention, an apparatus for managing tokens for Digital Rights Management (DRM) is provided. The apparatus includes a communication module for exchanging a message with at least one of a Rights Issuer (RI) and a Secure Removable Media (SRM), and a token management module for acquiring a token from the RI through the communication module and for delivering the acquired token to the SRM through the communication module using a token move request message. Accordingly, the token can be shared by several terminals.

In accordance with yet another aspect of the present invention, an apparatus for managing tokens for Digital Rights Management is provided. The apparatus includes a Secure Removable Media (SRM) agent for receiving at least one token acquired from a Rights Issuer (RI) from a first terminal through a token move request message, and a storage for storing the acquired token. Accordingly, the token can be shared by several terminals.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While names of entities defined in Open Mobile Alliance (OMA), which is a standard organization for mobile applications, will be used herein for convenience purpose only, they are not intended to limit the scope of the present invention, and the invention can be applied to any system having similar technical backgrounds.

Figure 1:
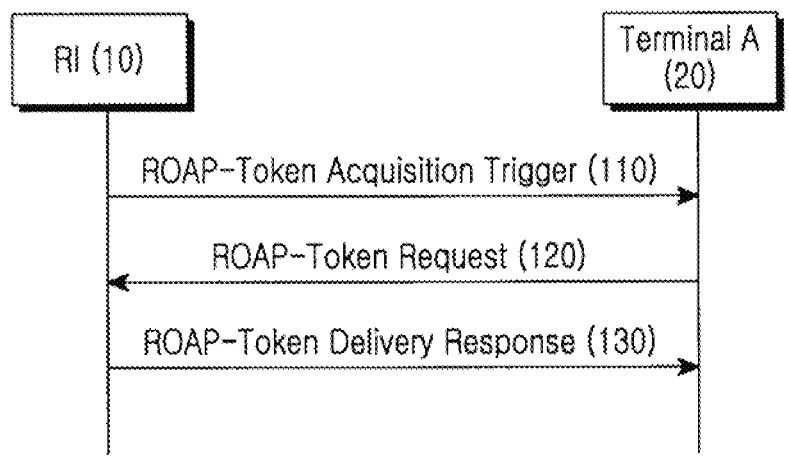
FIG. 1 illustrates a message flow between a server and a terminal for use of tokens in an Open Mobile Alliance (OMA) Broadcast (BCAST) environment according to an exemplary embodiment of the present invention.

FIG. 1 illustrates a message flow between a server and a terminal for use of tokens in an Open Mobile Alliance (OMA) Broadcast (BCAST) environment according to an exemplary embodiment of the present invention.

Referring to FIG. 1, a Rights Issuer (RI) 10 provides rights to use services. That is, the RI 10 issues rights to use services or contents to valid users. After the RI 10 sends a Rights Object Acquisition Protocol (ROAP)-Token Acquisition Trigger message to a terminal_A 20 in step 110, the terminal_A 20 may send a request for tokens to the RI 10, or a server, through a ROAP-Token Request message in step 120. The ROAP-Token Acquisition Trigger message is a message for allowing the terminal_A 20 to begin executing a protocol for token acquisition. In response thereto, the terminal_A 20 receives a ROAP-Token Delivery Response message in step 130. The ROAP-Token Delivery Response message the terminal_A 20 received in step 130, includes the number of tokens that a user requested. Using the received tokens, the terminal_A 20 can play back broadcast services and contents.

Figure 2:
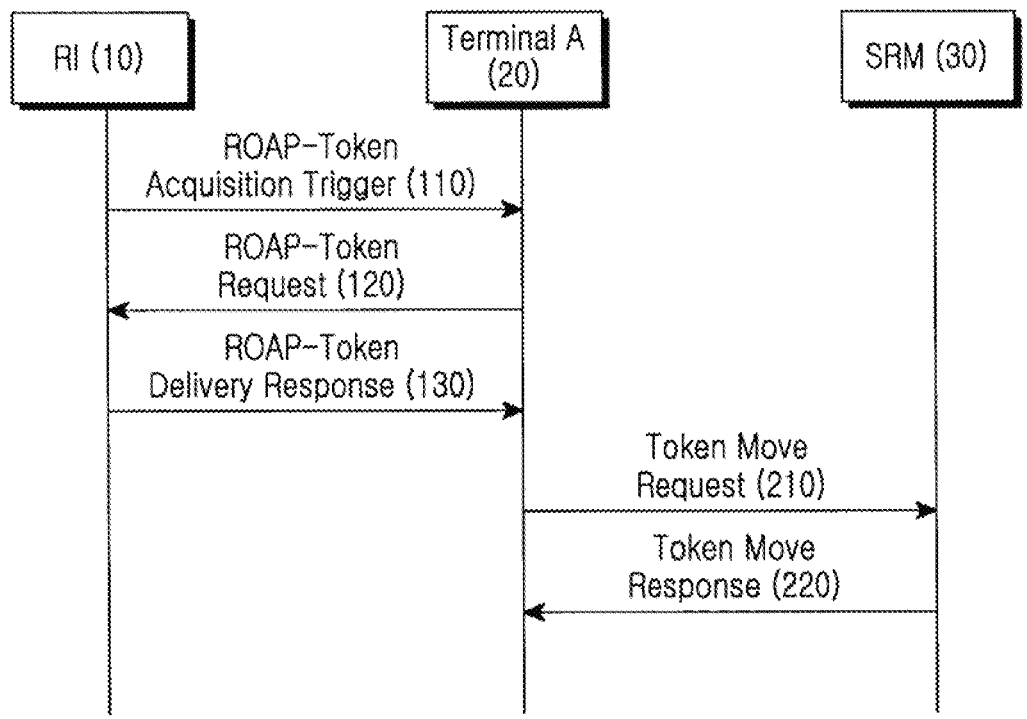
FIG. 2 illustrates a message flow for token movement between a terminal_A and an Secure Removable Media (SRM) according to an exemplary embodiment of the present invention.
Figure 3:
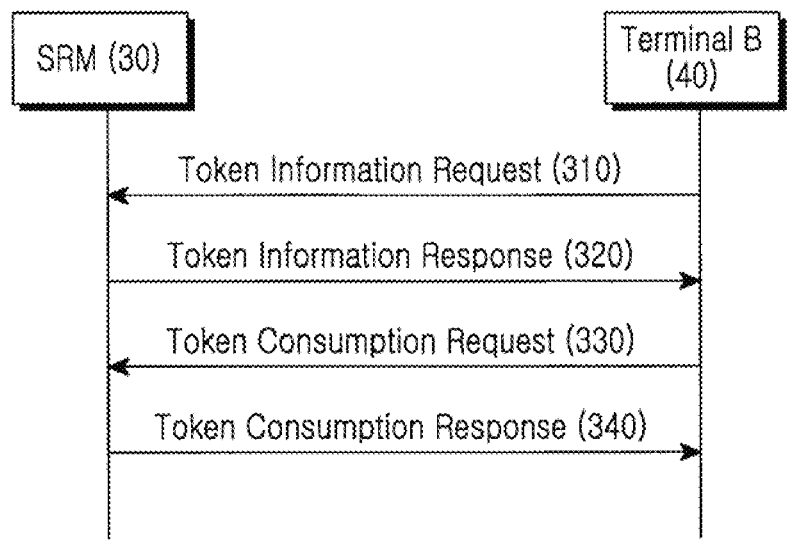
FIG. 3 illustrates a message flow for token use between a terminal_B and an SRM according to an exemplary embodiment of the present invention.
Figure 4:
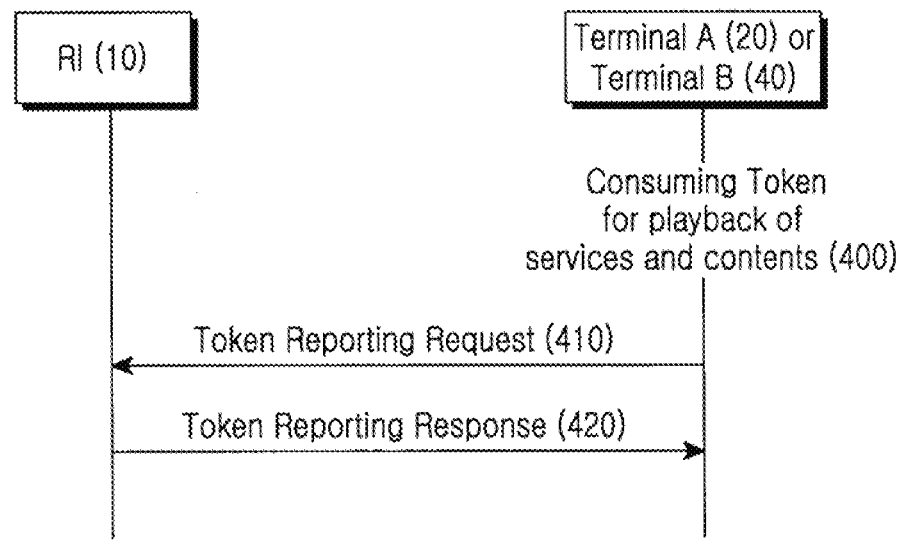
FIG. 4 illustrates a message flow for token reporting between a terminal_B and an Rights Issuer (RI) according to an exemplary embodiment of the present invention.

Before they are described, it should be noted that certain details of the messages illustrated in FIGS. 2 to 4 are given in Table 1 to Table 7 below. In Table 1 to Table 7, the terms "M" and "O" in each table denote "mandatory" and "optional," respectively.

FIG. 2 is a message flow diagram illustrating a method in which a terminal_A 20 moves tokens received from an RI 10 to a Secure Removable Media (SRM) 30 according to an exemplary embodiment of the present invention. The exemplary embodiment illustrated in FIG. 2 shows a message flow based on an architecture under discussion in the OMA BCAST standard and the OMA DRM standard.

Generally, FIG. 2 illustrates a terminal_A 20 that acquires tokens from an RI 10 in steps 110 to 130, by a process substantially identical to the process illustrated in FIG. 1, and moves the tokens to an SRM 30 through steps 210 and 220.

Table 1 below illustrates a format of a Token Move Request message sent in step 210. The Token Move Request message, which is sent from the terminal_A to the SRM 30 in step 210, is a message used to move a number of tokens from the terminal_A 20 to the SRM 30.

In step 210, the terminal_A 20 moves the tokens received from the RI 10, to the SRM 30 through the Token Move Request message. When the tokens were issued by a specific RI 10, the terminal_A 20 designates an RI Identifier (ID) field in Table 1, prior to transmission, to indicate the specific RI that issued the tokens. When the tokens are available only in a specific service or program, the terminal_A 20 designates a Service ID/Program ID field in Table 1, prior to transmission, to indicate the service or program for which the tokens are available. When there exist a latest token consumption time, an earliest reporting time, and a latest reporting time, which are used in the existing OMA BCAST v1.0 environment, the terminal_A 20 may designate them before transmission. In step 220, the SRM 30 sends a Token Move Response message in response to the Token Move Request message.

In Table 1, a Movable field indicates if the tokens designated by the Token Move Request message can be moved to another terminal.

A Domain ID field indicates that the tokens designated by the Token Move Request message are tokens that can be shared in a group of terminals, like the domain of OMA DRM v2.0. The term "domain" as used herein refers to a logical bundle of devices and, in the present example, tokens can be shared among the devices belonging to a domain. For example, when there are 100 tokens designated for a specific domain, the devices included in the specific domain may use the 100 tokens individually or share the 100 tokens, according to rules established by the service provider. That is, members of a domain corresponding to a specific Domain ID can use tokens individually. For example, when there are 20 tokens, terminals belonging to a specific Domain ID can use 20 tokens each.

A Signature field is a value of a Message Authentication Code (MAC) which was executed with an encryption key shared between the terminal_A 20 and the SRM 30 to guarantee integrity of the Token Move Request message. The Signature field may also include a value obtained by making an electronic signature on the Token Move Request message with a secret key of the terminal_A 20. An exemplary format of the Token Move Request message sent in step 210 is illustrated in Table 1.

TABLE 1

| Field | M/O | Description |
|---|---|---|
| Device ID | M | Identifies the requesting Device. |
| SRM ID | M | Identifies the SRM where tokens should be moved to. |
| RI ID | M | Identifies the authorizing RI. |
| Service ID/Program ID | O | Identifies the specific service or program. |
| Movable | O | Indicates whether these tokens can be moved. |
| Domain ID | O | Indicates whether these tokens can be shared among members of the specific domain. |
| Token Reporting URL | O | The presence of this field indicates that token consumption from this token delivery must be reported. The field defines the URL to which the ROAPTokenConsumptionReport message should later be sent. |
| Token Delivery ID | M | Identifies the tokens to be issued to this device in a similar fashion to the way an RO ID identifies an RO. The Token Delivery ID MUST uniquely identify the tokens to be issued in the TokenDeliveryResponse. |
| Latest Token Consumption Time | O | After the date/time indicated in this field, the device SHALL NOT use any tokens which have been received after the last ROAP-TokenDeliveryResponse message which includes a token reporting URL. If reports are being made on time by the device, this date is constantly being updated and therefore consumption should never be blocked. This field should only be defined when a token reporting URL is defined. |
| Earliest Reporting Time | O | The device should report consumption after this time and before the latest reporting time. |
| Latest Reporting Time | O | The device should report consumption before this time and after the earliest reporting time. |
| Token Quantity | M | Contains the number of tokens to be moved. |
| Signature | M | A signature on this message. |

Table 2 below illustrates a format of the Token Move Response message that the SRM 30 sends to the terminal_A 20 in step 220. The Token Move Response message is used by the terminal_A 20 to determine receipt of the tokens delivered to the SRM 30 after it moves the tokens to the SRM 30 through the Token Move Request message in step 210. A Moved Token Amount field shows the number of tokens moved to the SRM 30. A Signature field is a MAC created with an encryption key that the SRM 30 shares with the terminal_A 20, or indicates a value of electronic signature that the terminal_A 20 made (or affixed) with its own private key.

TABLE 2

| Field | M/O | Description |
|---|---|---|
| Device ID | M | Identifies the requesting device. |
| SRM ID | M | Identifies the SRM where tokens are moved to. |
| Token Delivery ID | M | Unique identifier for tokens. |
| Moved Token Amount | O | Contains the number of tokens moved to. |
| Signature | M | A signature on this message. |

FIG. 3 illustrates a message flow in which a terminal_B 40 uses tokens stored in an SRM 30 according to an exemplary embodiment of the present invention.

The terminal_B 40 is a different terminal than the terminal_A 20. It is assumed in FIGS. 3 and 4 that as an SRM 30, which was inserted in the terminal_A 20, is inserted into the terminal_B 40, the terminal_B 40 uses tokens stored in the SRM 30.

In step 310, the terminal_B 40 sends a Token Information Request message to the SRM 30, before using the tokens stored in the SRM 30, to determine what types of tokens are stored in the SRM 30. In step 320, the SRM 30 sends a Token Information Response message to the terminal_B 40 in response thereto, providing information about the types of the tokens stored therein. Thereafter, when the terminal_B 40 sends a request for its desired tokens to the SRM 30 through a Token Consumption Request message in step 330, the SRM 30 sends a Token Consumption Response message including the tokens desired by the terminal_B 40, to the terminal_B 40 in step 340.

Table 3 illustrates a format of the Token Information Request message sent in step 310. The Token Information Request message is used when the terminal_B 40 requests information about tokens stored in the SRM 30.

In more detail, in step 310 the terminal_B 40 requests information about tokens stored in the SRM 30. The SRM 30, which has received the Token Information Request message, only returns information about tokens issued by an RI 10 corresponding to an RI ID, to the terminal_B 40 through the Token Information Response message of step 320, if an RI ID field exists in the Token Information Request message.

However, the SRM 30, which has received the Token Information Request message of step 310, only returns information about tokens available for a specific service or program to the terminal_B 40 through the Token Information Response message of step 320, if a Service ID/Program ID field exists in the Token Information Request message. In addition, if none of the RI ID and the Service ID/Program ID exists in the SRM 30, the SRM 30 returns information on all the tokens stored therein through the Token Information Response message of step 320. A Signature field in Table 3 is a MAC created with an encryption key that the terminal_B 40 shares with the SRM 30, or indicates a value of electronic signature that the terminal_B 40 made with its own private key.

TABLE 3

| Field | M/O | Description |
| --- | --- | --- |
| Device ID | M | Identifies the requesting device. |
| SRM ID | M | Identifies the recipient SRM. |
| RI ID | O | If this element is present, only information on tokens issued from this RI is returned. |
| Service ID/ Program ID | O | Identifies the specific service or program. |
| Signature | M | A signature on this message. |

Table 4 illustrates a format of the Token Information Response message sent in step 320. In step 320, the terminal_B 40 receives the Token Information Response message from the SRM 30 in response to the Token Information Request message sent in step 310.

In Table 4, RI ID is a field that indicates whether tokens indicated by this message have been issued by an RI 10 designated in an RI ID field, and a Service ID/Program ID field indicates whether these tokens are only for the specific service or program. A Token Quantity field indicates the number of tokens designated in the Token Information Response message stored in the SRM 30. A Movable field indicates if theses tokens can be used in other terminals, i.e. indicates whether these tokens can be used in terminals other than the terminal_A 20 that moved the tokens to the SRM 30. If a terminal other than the terminal_A 20, like the terminal_B 40, can also use the tokens, a value of the Movable field is designated as "True." Otherwise, it is designated as "False." A Signature field is a MAC created with an encryption key that the SRM 30 shares with the terminal_B 40, or indicates a value of electronic signature that the terminal_B 40 made with its own private key.

TABLE 4

| Field | M/O | Description |
| --- | --- | --- |
| Device ID | M | Identifies the requesting device. |
| SRM ID | M | Identifies the recipient SRM. |
| RI ID | M | If this element is present, only information on tokens issued from this RI is returned. |
| Service ID/Program ID | O | Identifies the specific service or program. |
| Movable | O | Indicates whether these tokens can be moved. |
| Domain ID | O | Indicates whether these tokens can be shared among members of the specific domain. |
| Token Quantity | M | Contains the number of tokens issued from the RI for the designated Service or Program. |
| Signature | M | A signature on this message. |

Table 5 below illustrates a format of the Token Consumption Request message that the terminal_B 40 sends to the SRM 30 in step 330. In step 340, the terminal_B 40 receives a Token Consumption Response message from the SRM 30 in response to the Token Consumption Request message sent in step 330.

When the terminal_B 40 intends to use, or consume, the tokens issued by a specific RI 10, it designates 'RI ID' in the Token Consumption Request message, before transmission, to indicate the specific RI. In this case, Service ID/Program ID is not designated. When the terminal_B 40 intends to use the tokens available for a specific service or program, it designates Service ID/Program ID in the Token Consumption Request message before transmission, to indicate the specific service or program. When none of RI ID and Service ID/Program ID is designated, the SRM 30 returns all of its tokens through the Token Consumption Response message of step 340. That is, the SRM 30 delivers the requested tokens to the terminal_B 40 through a Token field in the Token Consumption Response message defined in Table 6. In this case, a value of a Requested Amount of Tokens field in the Token Consumption Request message of step 330 is not designated.

When the terminal_B 40 is a member of a specific domain and the SRM 30 has tokens belonging to a Domain ID of the specific domain, the terminal_B 40 can designate a Domain ID field as the specific Domain ID in the Token Consumption Request message in step 330, requesting tokens for the specific domain.

A Signature field in the Token Consumption Request message is a MAC created with an encryption key that the terminal_B 40 shares with the SRM 30, or indicates a value of electronic signature that the terminal_B 40 made with its own private key.

TABLE 5

| Field | M/O | Description |
| --- | --- | --- |
| Terminal ID | M | Identifies the requesting device. |
| SRM ID | M | Identifies the recipient SRM. |
| RI ID | O | If this element is present, only information on tokens issued from this RI is returned. |
| Service ID/Program ID | O | Identifies the specific service or program. |
| Domain ID | O | Indicates whether these tokens can be shared among members of the specific domain. |
| Requested Amount of Tokens | M | Contains the number of tokens issued from the RI for the designated Service or Program. |
| Signature | M | A signature on this message. |

Table 6 illustrates a format of the Token Consumption Response message that the SRM 30 sends to the terminal_B 40 in step 340. The terminal_B 40 receives the Token Consumption Response message from the SRM 30 in response to the Token Consumption Request message of step 330, in step 340.

In Table 6, an RI ID field indicates an RI that issued the tokens that the terminal requested through the Token Consumption Request message. A Service ID/Program ID field indicates a specific service or program for which the tokens are available that the terminal requested through the Token Consumption Request message. Further, a Movable field indicates if the tokens included in the Token Consumption Response message can be moved to other terminals. A Domain ID field indicates if the tokens can be shared among members of a specific domain.

The SRM 30 removes, from its stored tokens, as many tokens as a 'Requested Amount of Token' value that the terminal_B 40 designated in the Token Consumption Request message of step 330.

If Domain ID is designated, the SRM 30 does not remove tokens, the number of which corresponds to Requested Amount of Token that the terminal_B 40 designated in the Token Consumption Response message. This is to allow other devices in the domain to share as many tokens as the number corresponding to Requested Amount of Tokens. For the tokens for a specific domain, the SRM 30 stores the number of tokens it delivered and an ID of the terminal_B 40 in order not to provide the tokens for the specific domain to the terminal_B 40 in a duplicate manner. However, the SRM 30 should remove as many tokens as the number corresponding to Requested Amount of Tokens, when the devices in the domain share the tokens, the number of which is designated in Requested Amount of Tokens, instead of using them independently, according to rules established by the service provider.

Further, in step 340 the SRM 30 sends the Token Consumption Response message including Latest Token Consumption Time, Earliest Reporting Time, Latest Reporting Time, and the like, which include information needed when the terminal_B 40 intends to send the Token Reporting Request message. A Signature field in the Token Consumption Response message may be a MAC created with an encryption key that the SRM 30 shares with the terminal_B 40, or indicates a value of electronic signature that the terminal_B 40 made with its own private key.

the RI 10 in step 410. Upon receipt of the Token Reporting Request message, the RI 10 sends a Token Reporting Response message to the terminal_A 20 or the terminal_B 40 in response thereto in step 420.

Table 7 illustrates a format of the Token Reporting Request message of step 410. In step 410, the terminal_A 20 or the terminal_B 40 should insert information about the number of consumed tokens into a Token Consumed field in Table 7, and send it to the RI 10. In addition, the terminal_A 20 or the terminal_B 40 may include a Service ID or a Program ID in the Token Reporting Request message in an attempt to indicate if the tokens have been consumed for a specific service or program. Further, an RI ID field can also be included to identify the RI 10.

If tokens subjected to reporting include tokens corresponding to a specific domain, the terminal_A 20 or the terminal_B 40 should designate the specific Domain ID in Table 7.

If the Latest Token Consumption Time of the tokens provided from the SRM 30 through the Token Consumption

TABLE 6

| Field | M/O | Description |
| --- | --- | --- |
| Device ID | M | Identifies the requesting device. |
| SRM ID | M | Identifies the recipient SRM. |
| RI ID | O | If this element is present, only information on tokens issued from this RI is returned. |
| Service ID/Program ID | O | Identifies the specific service or program. |
| Movable | O | Indicates whether these tokens can be moved. |
| Domain ID | O | Indicates whether these tokens can be shared among members of the specific domain. |
| Token Reporting URL | O | The presence of this field indicates that token consumption from this token delivery must be reported. The field defines the URL to which the ROAPTokenConsumptionReport message should later be sent. |
| Token Delivery ID | M | Identifies the tokens to be issued to this device in a similar fashion to the way an RO ID identifies an RO. The Token Delivery ID MUST uniquely identify the tokens to be issued in the TokenDeliveryResponse. |
| Latest Token Consumption Time | O | After the date/time indicated in this field, the device SHALL NOT use any tokens which have been received after the last ROAP-TokenDeliveryResponse message which includes a token reporting URL. If reports are being made on time by the device, this date is constantly being updated and therefore consumption should never be blocked. This field should only be defined when a token reporting URL is defined. |
| Earliest Reporting Time | O | The device should report consumption after this time and before the latest reporting time. |
| Latest Reporting Time | O | The device should report consumption before this time and after the earliest reporting time. |
| Token | M | Contains the number of tokens being issued. |
| Signature | M | A signature on this message. |

FIG. 4 illustrates a message flow in which a terminal_A 20 or a terminal_B 40 reports information on its consumed tokens to an RI 10 using Token Reporting messages according to an exemplary embodiment of the present invention. That is, in the message flow, the terminal_A 20 or the terminal_B 40 sends a Token Reporting Request message to the RI 10 after consuming tokens to play back services and/or contents, and the RI 10 sends a Token Reporting Response message in response to the Token Reporting Request message.

Referring to FIG. 4, the terminal_A 20 or the terminal_B 40 consumes tokens to play back services and/or contents in step 400, and sends a Token Reporting Request message to Response message has expired, the terminal_A 20 or the terminal_B 40 sends the Token Reporting Request message to the RI 10 in step 410. In this case, a Tokens Consumed field in the Token Reporting Request message should be designated as "0."

A Tokens Moved field in Table 7 indicates the number of tokens that the terminal_A 20 or the terminal_B 40 moved to another terminal or the SRM. In this regard, a Target ID indicates an ID of an SRM or of a terminal to which the tokens were moved.

A Signature field in Table 7 is a MAC created with an encryption key that the terminal_A 20 or the terminal_B 40 shares with the RI 10, or indicates a value of electronic signature that the terminal_A 20 or the terminal_B 40 made with its own private key.

The service provider can determine how the issued tokens are used, based on the above information.

TABLE 7

| Field | M/O | Description |
|---|---|---|
| Device ID | M | Identifies the requesting Device. |
| RI ID | M | Identifies the RI. |
| Token Delivery ID | M | Should be identical to the TokenDeliveryID value in the last ROAP-TokenDeliveryResponse message received by the device from this RI. The Token Delivery ID can be used by the RI to link this consumption report to the previous ROAP-TokenDeliveryMessage which defined the reporting period, reporting time, etc. for this report. |
| Nonce | M | This nonce is chosen by the Device. Nonces are generated and used in this message as specified in Section 5.3.10 of the OMA DRM v2.0 specification. |
| Report Time | M | The current DRM Time, as seen by the Device. |
| Service ID or Program ID | M | Identifiers of services or programs that tokens may be consumed for. |
| Domain ID | O | Indicates whether these tokens can be shared among members of the specific domain. |
| Tokens Consumed | O | Contains information on how many tokens were consumed since the last report. |
| Tokens Moved | O | Contains information on how many tokens were moved since the last report. |
| Target ID | O | Identifier of a Device or an SRM where tokens are moved to. |
| Certificate Chain | O | This field is sent unless it is indicated in the RI Context that this RI has stored necessary Device certificate information. When used the field value SHALL be as described for the Certificate Chain field in the ROAP-RegistrationRequest message. |
| Extensions | O | This field allows for addition of future extensions to the ROAP-TokenConsumptionReport message. |
| Signature | M | A signature on this message. |

The Token Reporting Response message of step 420 may follow the ROAP-Token Delivery Response message or the ROAP-Token Acquisition Trigger message according to the OMA standard.

Figure 5:
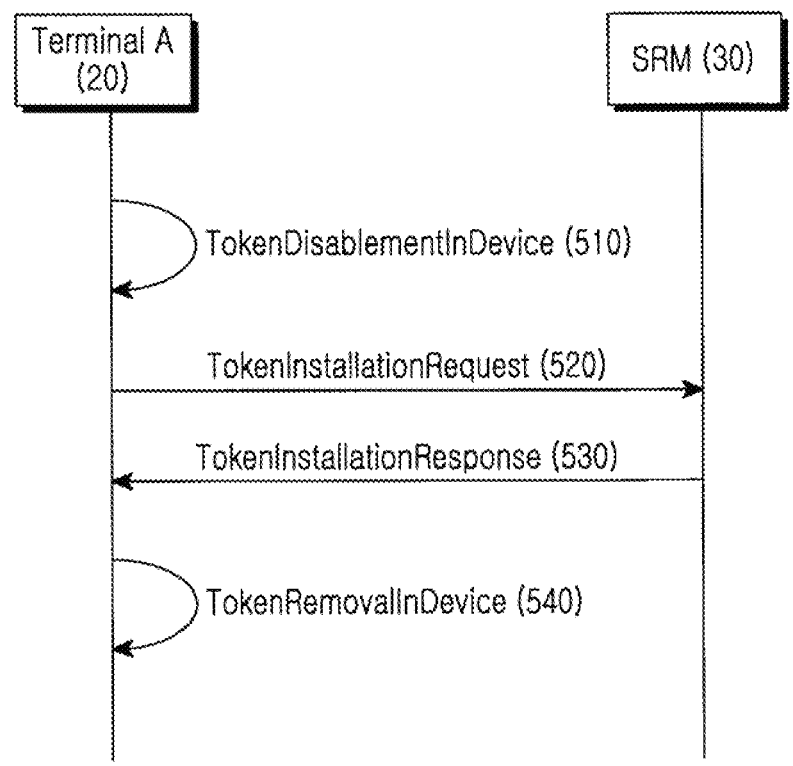
FIG. 5 illustrates a process flow in which a terminal_A moves tokens to an SRM based on an SRM standard according to an exemplary embodiment of the present invention.
Figure 6:
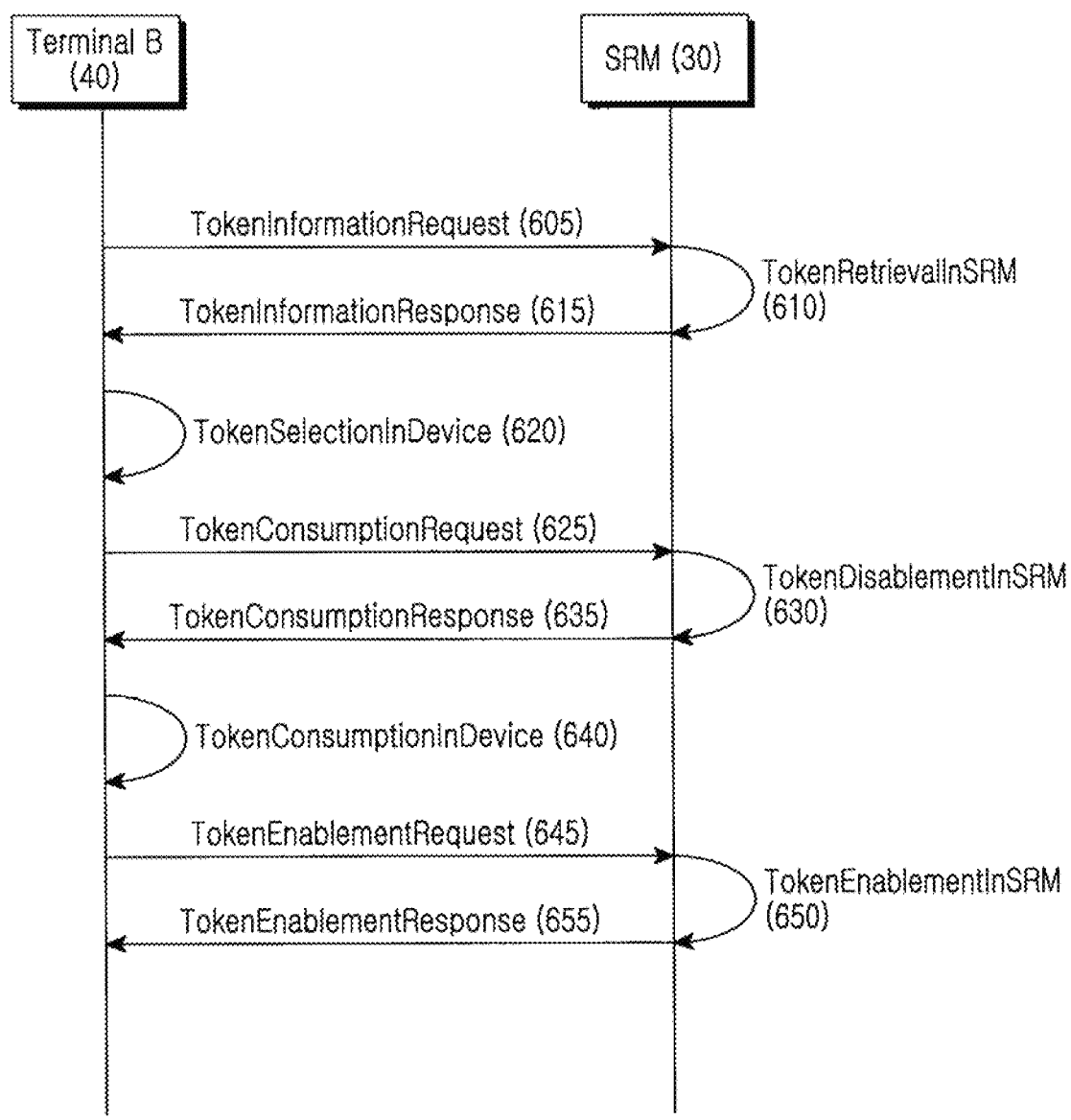
FIG. 6 illustrates a process flow in which a terminal_B uses tokens stored in an SRM according to an exemplary embodiment of the present invention.
Figure 7:
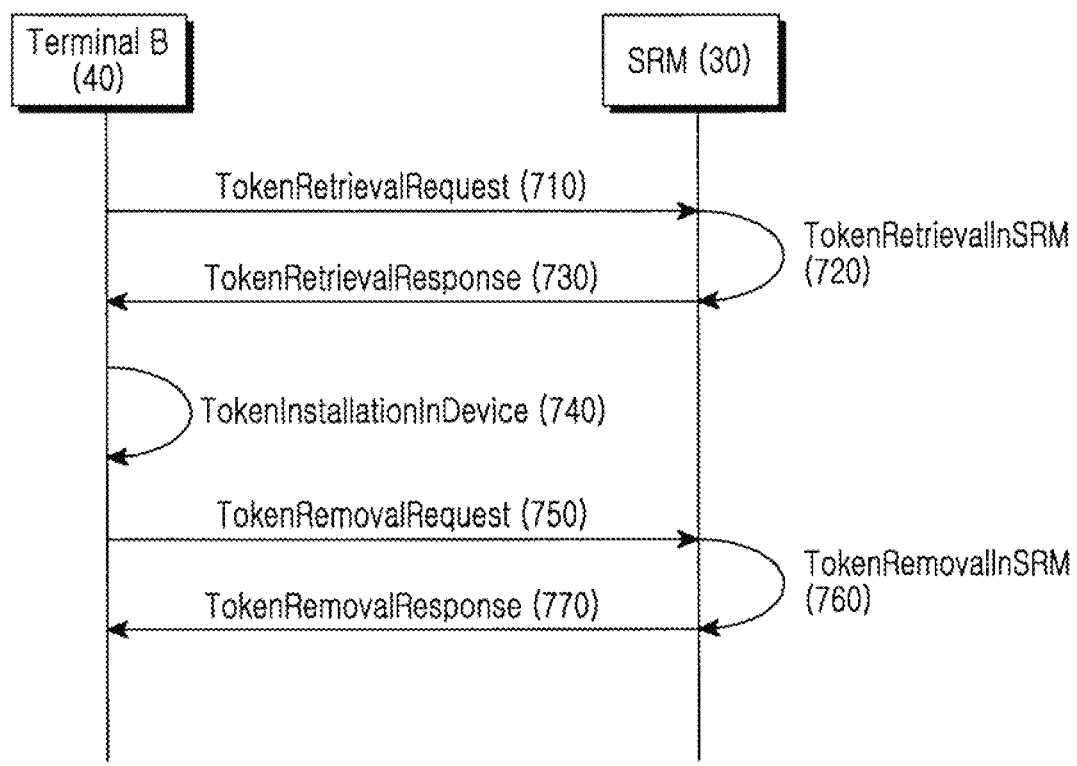
FIG. 7 illustrates a process of moving tokens stored in an SRM to a terminal_B according to an exemplary embodiment of the present invention.

FIGS. 5 to 7 illustrate processes of handling the messages illustrated in FIGS. 2 and 3 based on the SRM standard established in OMA according to an exemplary embodiment of the present invention.

FIG. 5 illustrates a process flow in which a terminal_A 20 moves tokens to an SRM 30 based on the SRM standard according to an exemplary embodiment of the present invention. In step 510, the terminal_A 20 disables the tokens it intends to move.

In step 520, the terminal_A 20 includes the tokens it intends to move in a Token Installation Request message, and sends the message to the SRM 30. The Token Installation Request message sent in step 520 is described in Table 8. In step 530, the SRM 30 provides the terminal_A 20 with information on the received tokens using a Token Installation Response message. The Token Installation Response message sent in step 530 is described in Table 9.

Finally, in step 540, the terminal_A 20 removes the tokens moved to the SRM 30.

Table 8 below illustrates a format of the Token Installation Request message. This message is sent in step 210 of FIG. 2 and defined by describing the Token Move Request message described in Table 1 in accordance with the OMA SRM standard.

Similarly, Table 9 below illustrates a format of the Token Installation Response message. This message is sent in step 220 of FIG. 2 and defined by describing the Token Move Response message described in Table 2 in accordance with the OMA SRM standard.

TABLE 8

| Fields | Protection | Description |
|---|---|---|
| RI ID | Integrity | Identifies the authorizing RI. |
| Service ID/Program ID | Integrity | Identifies the specific service or program. |
| Moveable | Integrity | Indicates whether these tokens can be moved. |
| Domain ID | Integrity | Indicates whether theses tokens can be shared among members of the specific domain. |
| Token Reporting URL | Integrity | The presence of this field indicates that token consumption from this token delivery must be reported. The field defines the URL to which the ROAPTokenConsumptionReport message should later be sent. |
| Token Delivery ID | Integrity | Identifies the tokens to be issued to this device in a similar fashion to the way an RO ID identifies an RO. The Token Delivery ID MUST uniquely identify the tokens to be issued in the |

TABLE 8-continued

| Fields | Protection | Description |
|---|---|---|
| Latest Token Consumption Time | Integrity | TokenDeliveryResponse. After the date/time indicated in this field, the device SHALL NOT use any tokens which have been received after the last ROAP-TokenDeliveryResponse message which includes a token reporting URL. If reports are being made on time by the device, this date is constantly being updated and therefore consumption should never be blocked. This field should only be defined when a token reporting URL is defined. |
| Earliest Reporting Time | Integrity | The device should report consumption after this time and before the latest reporting time. |
| Latest Reporting Time | Integrity | The device should report consumption before this time and after the earliest reporting time. |
| Token Quantity | Integrity | Contains the number of tokens to be moved. |

TABLE 9

| Fields | Protection | Description |
|---|---|---|
| Status | Integrity | The result of processing the TokenInstallationRequest message. |

FIG. 6 illustrates a process flow in which a terminal_B 40 uses tokens stored in an SRM 30 according to an exemplary embodiment of the present invention.

In step 605, a terminal_B 40 sends a request for information about tokens stored in an SRM 30, to the SRM 30 using a Token Information Request message.

A format of the Token Information Request message sent in step 605 can be described as illustrated in Table 10 in accordance with the OMA SRM standard.

TABLE 10

| Fields | Protection | Description |
|---|---|---|
| RI ID | Integrity | If this element is present, only information on tokens issued from this RI is returned. |
| Service ID/Program ID | Integrity | Identifies the specific service or program. |

The SRM 30 retrieves information about its stored tokens in step 610, and forwards the information on its stored tokens to the terminal_B 40 through a Token Information Response message in step 615.

A format of the Token Information Response message sent in step 615 can be described as illustrated in Table 11 in accordance with the OMA SRM standard.

TABLE 11

| Fields | Protection | Description |
|---|---|---|
| Status | Integrity | The result of processing the TokenInformationRequest message. |
| RI ID | Integrity | If this element is present, only information on tokens issued from this RI is returned. |
| Service ID/Program ID | Integrity | Identifies the specific service or program. |
| Movable | Integrity | Indicates whether these tokens can be moved. |
| Domain ID | Integrity | Indicates whether these tokens can be shared among members of the specific domain. |
| Token Quantity | Integrity | Contains the number of tokens issued from the RI for the designated Service or Program. |

In an exemplary implementation, Table 11 may have the same format as illustrated in Table 12.

TABLE 12

| Fields | Protection Requirement | Description |
|---|---|---|
| Status | Integrity | The result of processing the Token Information Request message. |
| Token Information List | Integrity | This field consists of RI ID, Service ID/Program ID, Movable, Domain ID and Token Quantity. |

In Table 12, Token Information List is defined as illustrated in Table 13.

TABLE 13

```
TokenInformationList ( ) {
    nbrOfTokenDeliveryID    8    uimsbf
    for (I = 0; I < nbrOfTokenDeliveryID; i++) {
        TokenInformation ( )
    }
}
```

In Table 13, Token Information is defined as illustrated in Table 14.

TABLE 14

```
TokenInformation ( ) {
    RI ID ( )
    Service ID/Program ID ( )
    Movable ( )
    Domain ID ( )
    Token Quantity ( )
}
```

In an exemplary embodiment, a Token Handle( ) field can be further added to Table 14. The Token Handle field is a separator the SRM designates to internally separate types of tokens.

The terminal_B 40 selects its desired tokens in step 620, and then provides the SRM 30 with type information of the selected tokens using a Token Consumption Request message in step 625.

A format of the Token Consumption Request message can be described as illustrated in Table 15. This message is defined by describing the Token Consumption Request message in accordance with the OMA SRM standard.

TABLE 15

| Fields | Protection | Description |
| --- | --- | --- |
| RI ID | Integrity | If this element is present, only information on tokens issued from this RI is returned. |
| Service ID/Program ID | Integrity | Identifies the specific service or program. |
| Domain ID | Integrity | Indicates whether these tokens can be shared among members of the specific domain. |

In an exemplary embodiment, a field illustrated in Table 16 can be further added to Table 15.

TABLE 16

| Requested Amount of Tokens | Integrity | Contains the number of tokens issued from the RI for the designated Service or Program. |
| --- | --- | --- |

In an exemplary implementation, Table 15 may include a Token Handle field alone. Even in this case, the required number of tokens, defined in Table 16, can be designated.

The SRM 30 disables tokens desired by the terminal_B 40, i.e. tokens received in the Token Consumption Request message in step 630, and delivers them in a Token Consumption Response message in step 635. The reason for disabling tokens received in the Token Consumption Request message in step 630 is to prevent another application or the same application from using tokens requested by a specific application in the terminal. Further, the tokens included in the Token Consumption Response message are the tokens disabled in step 630.

An exemplary format of the Token Consumption Response message sent in step 635 can be described as illustrated in Table 17. This message is defined by describing the Token Consumption Response message in accordance with the OMA SRM standard.

TABLE 17

| Fields | Protection | Description |
| --- | --- | --- |
| Status | Integrity | The result of processing the TokenConsumptionRequest. |
| RI ID | Integrity | If this element is present, only information on tokens issued from this RI is returned. |
| Service ID/ Program ID | Integrity | Identifies the specific service or program. |
| Movable | Integrity | Indicates whether these tokens can be moved. |
| Domain ID | Integrity | Indicates whether these tokens can be shared among members of the specific domain. |
| Token Reporting URL | Integrity | The presence of this field indicates that token consumption from this token delivery must be reported. The field defines the URL to which the ROAPTokenConsumptionReport message should later be sent. |
| Token Delivery ID | Integrity | Identifies the tokens to be issued to this device in a similar fashion to the way an RO ID identifies an RO. The Token Delivery ID MUST uniquely identify the tokens to be issued in the TokenDeliveryResponse. |
| Latest Token Consumption Time | Integrity | After the date/time indicated in this field, the device SHALL NOT use any tokens which have been received after the last ROAP-TokenDeliveryResponse message which includes a token reporting URL. If reports are being made on time by the device, this date is constantly being updated and therefore consumption should never be blocked. This field should only be defined when a token reporting URL is defined. |

TABLE 17-continued

| Fields | Protection | Description |
| --- | --- | --- |
| Earliest Reporting Time | Integrity | The device should report consumption after this time and before the latest reporting time. |
| Latest Reporting Time | Integrity | The device should report consumption before this time and after the earliest reporting time. |
| Token Quantity | Integrity | Contains the number of tokens being issued. |

In step 640, the terminal_B 40 plays back contents using the tokens that it acquired through the Token Consumption Response message in step 635.

When the use of the tokens is completed, the terminal_B 40 sends a Token Enablement Request message to the SRM 30 to request release of the disabled tokens in step 645 so that another terminal may also use the tokens stored in the SRM 30. A format of the Token Enablement Request message sent in step 645 is described as Table 18.

TABLE 18

| Fields | Protection | Description |
| --- | --- | --- |
| Token Delivery ID | Integrity | Identifies the tokens to be issued to this device in a similar fashion to the way an RO ID identifies an RO. The Token Delivery ID MUST uniquely identify the tokens to be issued in the TokenDeliveryResponse |
| Token Information | Integrity | New information on the status of Token. |

In an exemplary implementation, a Token Delivery ID field in Table 18 is replaceable with a Token Handle field.

Upon receiving the Token Enablement Request message in step 645, the SRM 30 removes a number of tokens from the release-requested tokens equal to the number of tokens consumed in the terminal_B 40, designated in a Token Information field, and then re-enables the remaining tokens in step 650. In step 655, the SRM 30 sends the result of the re-enabling of the release-requested tokens, to the terminal_B 40 through a Token Enablement Response message. The result of enabling the tokens is information indicating an "enabled status of the tokens."

An exemplary format of the Token Enablement Response message sent in step 655 is described in Table 19.

TABLE 19

| Fields | Protection | Description |
| --- | --- | --- |
| Status | Integrity | The result of processing the TokenEnablementRequest message. |

FIG. 7 illustrates a process of moving tokens stored in an SRM 30 to a terminal_B 40 according to an exemplary embodiment of the present invention.

In step 710, a terminal_B 40 sends a request for specific tokens stored in an SRM 30, to the SRM 30 through a Token Retrieval Request message.

An exemplary format of the Token Retrieval Request message sent in step 710 can be described as illustrated in Table 20.

TABLE 20

| Fields | Protection | Description |
| --- | --- | --- |
| Token Delivery ID | Integrity | Identifies the tokens to be issued to this device in a similar fashion to the way an RO ID identifies an RO. The Token Delivery ID MUST uniquely identify the tokens to be issued in the TokenDeliveryResponse. |

In an exemplary implementation, a Token Delivery ID field in Table 20 is replaceable with Token Handle. This message can further include a Requested Amount of Tokens field indicating the number of tokens the terminal_B 40 requests.

The SRM 30 retrieves specific tokens in step 720, and delivers the retrieved tokens to the terminal_B 40 through a Token Retrieval Response message in step 730. An exemplary format of the Token Retrieval Response message sent in step 730 can be described as illustrated in Table 21.

TABLE 21

| Fields | Protection | Description |
| --- | --- | --- |
| Status | Integrity | The result of processing the TokenRetrievalRequest message. |
| RI ID | Integrity | Identifies the authorizing RI. |
| Service ID/ Program ID | Integrity | Identifies the specific service or program. |
| Movable | Integrity | Indicates whether these tokens can be moved. |
| Domain ID | Integrity | Indicates whether these tokens can be shared among members of the specific domain. |
| Token Reporting URL | Integrity | The presence of this field indicates that token consumption from this token delivery must be reported. The field defines the URL to which the ROAPTokenConsumptionReport message should later be sent. |
| Token Delivery ID | Integrity | Identifies the tokens to be issued to this device in a similar fashion to the way an RO ID identifies an RO. The Token Delivery ID MUST uniquely identify the tokens to be issued in the TokenDeliveryResponse. |
| Latest Token Consumption Time | Integrity | After the date/time indicated in this field, the device SHALL NOT use any tokens which have been received after the last ROAP-TokenDeliveryResponse message which includes a token reporting URL. If reports are being made on time by the device, this date is constantly being updated and therefore consumption should never be blocked. This field should only be defined when a token reporting URL is defined. |
| Earliest Reporting Time | Integrity | The device should report consumption after this time and before the latest reporting time. |
| Latest Reporting Time | Integrity | The device should report consumption before this time and after the earliest reporting time. |
| Token Quantity | Integrity | Contains the number of tokens to be moved. |

In step 740, the terminal_B 40 stores therein the tokens delivered in step 730. In step 750, the terminal_B 40 sends a Token Removal Request message to the SRM 30 to request removal of the corresponding tokens (tokens that the terminal_B 40 retrieved in step 730) stored in the SRM 30. Upon receipt of the Token Removal Request message, the SRM 30 removes the corresponding tokens stored therein in step 760, and delivers the result to the terminal_B 40 through a Token Removal Response message in step 770.

An exemplary format of the Token Removal Request message sent in step 750 and an exemplary format of the Token Removal Response message sent in step 770 can be described as illustrated in Table 22 and Table 23 in accordance with the OMA SRM standard, respectively.

TABLE 22

| Fields | Protection Requirement | Description |
| --- | --- | --- |
| Token Delivery ID | Integrity | Identifies the tokens to be issued to this device in a similar fashion to the way an RO ID identifies an RO. The Token Delivery ID MUST uniquely identify the tokens to be issued in the TokenDeliveryResponse. |

In an exemplary implementation, a Token Delivery ID field in Table 22 is replaceable with a Token Handle field.

TABLE 23

| Fields | Protection | Description |
| --- | --- | --- |
| Status | Integrity | The result of processing TokenRemovableRequest message. |

Figure 8:
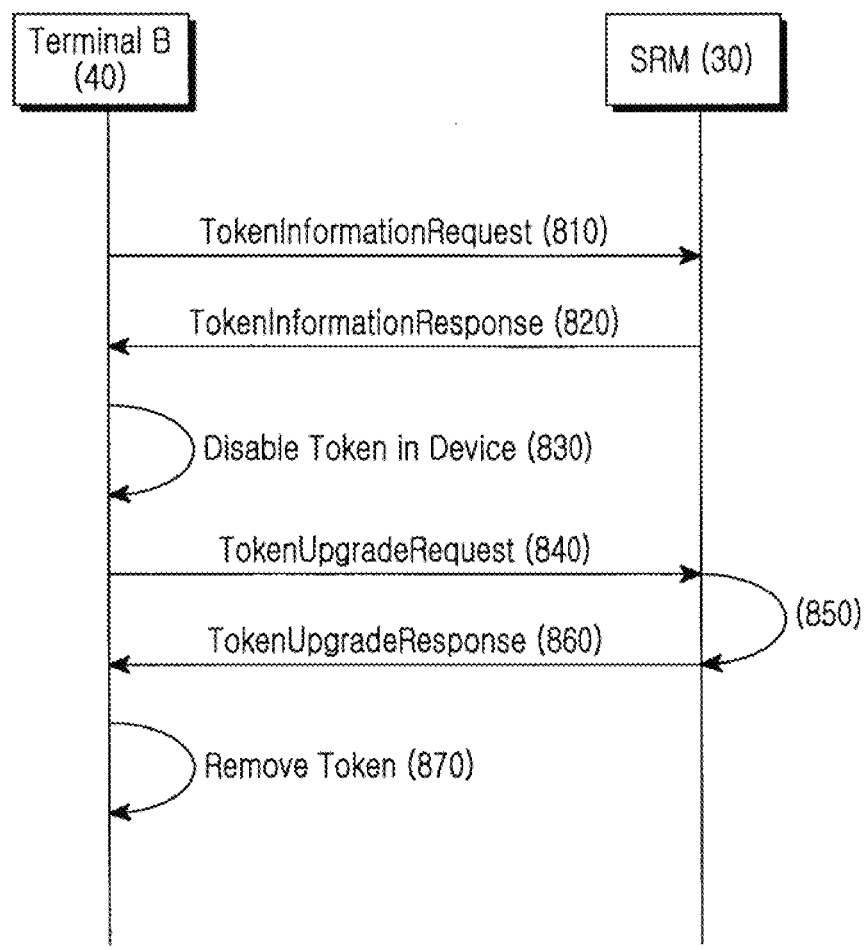
FIG. 8 illustrates a process of combining tokens in a terminal_B with tokens stored in an SRM according to an exemplary embodiment of the present invention.

FIG. 8 illustrates a process of combining tokens in a terminal_B 40 with tokens in an SRM 30 when the tokens the terminal_B 40 has are identical in type to the tokens in the SRM 30 according to an exemplary embodiment of the present invention.

Referring to FIG. 8, the terminal_B 40 acquires information about the tokens stored in the SRM 30 using the Token Information Request message and the Token Information Response message stated in steps 810 and 820.

In step 830, the terminal_B 40 disables the tokens it intends to deliver to the SRM 30. Subsequently, in step 840, the terminal_B 40 sends a Token Upgrade Request message defined in Table 24, to the SRM 30.

TABLE 24

| Field | M/O | Protection | Description |
| --- | --- | --- | --- |
| RI ID | M | Integrity | Identifies tokens issued from this RI. |
| Service ID/Program ID | O | Integrity | Identifies specific service or program. |
| Domain ID | O | Integrity | Identifies specific domain. |
| Token Delivery ID | M | Integrity | Identifies specific domain. |
| Latest Token Consumption Time | O | Integrity | Specifies new latest Token Consumption Time. |
| Token Quantity | O | Confidentiality | Contains amount of tokens to be set instead of the value stored in SRM. |

In an exemplary implementation, the Token Upgrade Request message may also have the following format.

TABLE 25

| Field | M/O | Protection | Description |
| --- | --- | --- | --- |
| Token Handle | M | Integrity | Identifies tokens within SRM. |
| Latest Token Consumption Time | O | Integrity | Specifies new Latest Token Consumption Time. |
| Token Quantity | O | Confidentiality | Contains amount of tokens to be set instead of the value stored in SRM. |

In step 850, the SRM 30 combines the tokens delivered from the terminal_B 40, with its own tokens which are equal in type to the delivered tokens. In step 860, the SRM 30 transmits the result to the terminal_B 40 through a Token Upgrade Response message defined in Table 26. In step 870, the terminal_B 40 removes the tokens delivered to the SRM 30.

TABLE 26

| Field | M/O | Protection | Description |
|---|---|---|---|
| Status | M | Integrity | The result of token upgrade request. |

In the following description, an apparatus that performs a token acquisition/delivery-related operation according to an exemplary embodiment of the present invention will be referred to as a token management apparatus. The token management apparatus may be a terminal or an SRM itself, or may be included in the terminal or the SRM.

Figure 9:
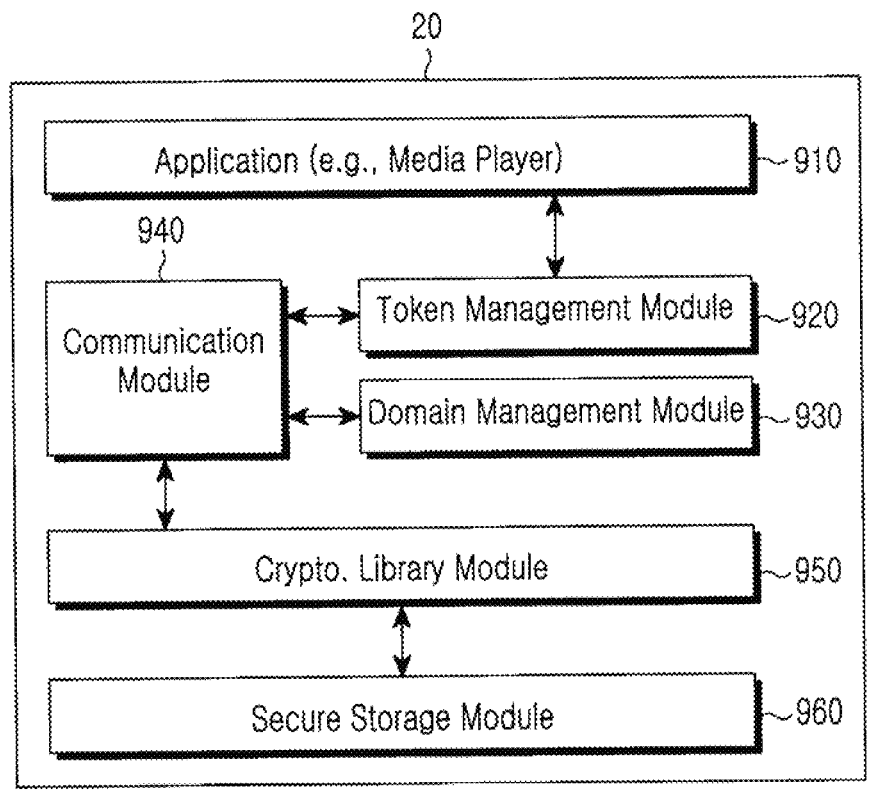
FIG. 9 is a block diagram of a terminal_A according to an exemplary embodiment of the present invention.

FIG. 9 illustrates functional modules of a terminal_A 20 according to an exemplary embodiment of the present invention. These functional modules can also be applied to the terminal_B 40 and other terminals, as well as the terminal_A 20.

Referring to FIG. 9, a token management module 920 creates and handles the messages proposed by the present invention. That is, the token management module 920 creates and handles the messages exchanged with an RI 10 or an SRM 30 according to an exemplary embodiment of the present invention. Through the message exchange, the token management module 920 retrieves tokens from the RI 10 or the SRM 30, and/or delivers the tokens to the SRM 30. The messages are transmitted and received through a communication module 940. Further, the token management module 920 stores and manages the tokens received at the terminal_A 20. The token management module 920 retrieves domain-related information from a domain management module 930 so that the tokens can be shared among terminals in the same domain.

The tokens are stored securely in a secure storage module 960. A crypto library module 950 can be used to manage the secure storage module 960 and protect messages.

An application 910, e.g. a Media Player™, can be used to play back contents, with the tokens provided through the token management module 920.

Figure 10:
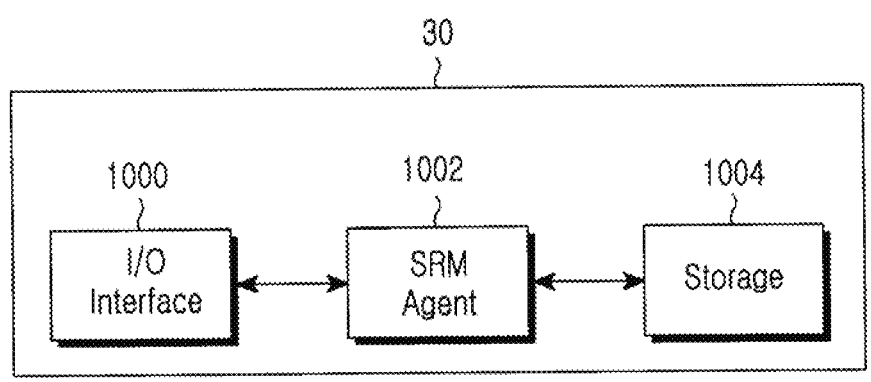
FIG. 10 is a block diagram of an SRM according to an exemplary embodiment of the present invention.

FIG. 10 is a block diagram of an SRM 30 according to an exemplary embodiment of the present invention.

Referring to FIG. 10, an I/O interface 1000 is used to exchange messages with an SRM 30 when the SRM 30 is inserted into another device. An SRM agent 1002, which manages the overall operation of the SRM 30, exchanges the messages proposed by the present invention with a terminal_A 20 and a terminal_B 40 through the I/O interface 1000. Further, the SRM agent 1002 acquires or moves tokens through a message transmission/reception procedure with the terminal_A 20 and the terminal_B 40, proposed by the present invention. A storage 1004 stores the tokens acquired by the SRM agent 1002.

As is apparent from the foregoing description, according to exemplary embodiments of the present invention, tokens needed to access mobile broadcast services and contents can be moved to an SRM, so that they can be used in several terminals.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A method for managing tokens for digital rights management (DRM) in a terminal, the method comprising:
    controlling a token management module for acquiring at least one token from a rights issuer (RI); and
    controlling the token management module for moving the token to a secure removable media (SRM) through a token installation request message,
    wherein the token can be shared by several terminals, and
    wherein the token installation request message includes:
        a field for indicating a token issuer;
        a field for indicating a service/programs for which the token can be used;
        a field for indicating whether the token can be moved to another terminal;
        a field for indicating whether the token can be shared among members of a specific domain;
        a field for indicating that a token consumption must be reported and defining a uniform resource locator (URL) to which a tokenconsumptionreport message should be sent;
        a field for indicating a latest token consumption time;
        a field for indicating an earliest reporting time;
        a field for indicating a latest reporting time; and
        a field for indicating the number of tokens.

2. A method for managing tokens for digital rights management (DRM) in a terminal, the method comprising:
    coupling the terminal to a secure removable media (SRM), the SRM including at least one token acquired from a rights issuer (RI) by another terminal; and
    controlling the terminal for acquiring the at least one token from the SRM,
    wherein the token can be shared by several terminals,
    wherein the acquiring of the at least one token comprises:
        sending a request for a token requested by the terminal to the SRM through a token consumption request message; and
        retrieving the requested token from the SRM through a token consumption response message, and
    wherein the token consumption response message includes:
        a field for indicating a token issuer;
        a field for indicating a service/programs for which the token can be used;
        a field for indicating whether the token can be moved to another terminal;
        a field for indicating whether the token can be shared among members of a specific domain;

a field for indicating that a token consumption must be reported and defining a uniform resource locator (URL) to which a tokenconsumptionreport message should be sent;
a field for indicating a latest token consumption time;
a field for indicating an earliest reporting time;
a field for indicating a latest reporting time; and
a field for indicating the number of tokens.

3. The method of claim 2, wherein the acquiring of the at least one token comprises:
sending a token information request message to the SRM to determine a type of the at least one token stored in the SRM; and
acquiring information about the type of the at least one token stored in the SRM, from the SRM through a token information response message.

4. The method of claim 3, wherein the token information response message includes at least one of:
an RI ID field for indicating an RI that issued the token,
a service ID/program ID field for indicating whether the token is available only for a specific service/program,
a moveable field for indicating whether the token is available in another terminal, or
a token quantity field for indicating a number of tokens designated by the token information response message, among tokens stored in the SRM.

5. The method of claim 3, wherein the token consumption request message includes at least one of:
an RI ID field for indicating a specific RI when the terminal intends to use a token issued by the specific RI,
a service ID/program ID field for indicating a specific service/program when the terminal intends to use a token available in the specific service/program, or
a domain ID field for indicating a specific domain when the terminal is a member of the specific domain and the SRM has a token corresponding to an ID of the specific domain.

6. The method of claim 2, further comprising:
sending the RI a token reporting request message including information about a number of consumed tokens, after the terminal consumed tokens for playback of at least one of a service and a content.

7. The method of claim 6, wherein the token reporting request message includes at least one of:
an RI ID field for identifying the RI,
a service ID/program ID field for indicating a specific service/program for which the token was used,
a tokens consumed field for indicating information about a number of consumed tokens,
a domain ID field for indicating a specific domain when the token belongs to the specific domain,
a target ID field for indicating an ID of at least one of an SRM and another terminal to which the token was moved, or
a token moved field for indicating a number of tokens moved to at least one of another terminal and the SRM.

8. A method for managing tokens for digital rights management (DRM) in a secure removable media (SRM), the method comprising:
controlling the SRM for receiving at least one token acquired from a rights issuer (RI) from a first terminal through a token installation request message,
wherein the token can be shared by several terminals, and
wherein the token installation request message includes:
a field for indicating a token issuer;
a field for indicating a service/programs for which the token can be used;
a field for indicating whether the token can be moved to another terminal;
a field for indicating whether the token can be shared among members of a specific domain;
a field for indicating that a token consumption must be reported and defining a uniform resource locator (URL) to which a tokenconsumptionreport message should be sent;
a field for indicating a latest token consumption time;
a field for indicating an earliest reporting time;
a field for indicating a latest reporting time; and
a field for indicating the number of tokens.

9. The method of claim 8, further comprising:
delivering the token to a second terminal, when the SRM is inserted into the second terminal and a request for information about the token is received from the second terminal.

10. The method of claim 9, wherein the delivering of the token to the second terminal comprises:
receiving from the second terminal a token information request message used to determine a type of a token stored in the SRM;
sending information about the type of the token stored in the SRM, to the second terminal through a token information response message;
receiving a request for a token desired by the second terminal through a token consumption request message; and
sending the requested token to the second terminal through a token consumption response message.

11. An apparatus for managing tokens for digital rights management (DRM), the apparatus comprising:
a communication module configured to exchange a message with at least one of a rights issuer (RI) and a secure removable media (SRM); and
a token management module configured to:
acquire a token from the RI through the communication module, and
deliver the acquired token to the SRM through the communication module using a token installation message,
wherein the token can be shared by several terminals, and
wherein the token installation request message includes:
a field for indicating a token issuer;
a field for indicating a service/programs for which the token can be used;
a field for indicating whether the token can be moved to another terminal;
a field for indicating whether the token can be shared among members of a specific domain;
a field for indicating that a token consumption must be reported and defining a uniform resource locator (URL) to which a TokenConsumptionReport message should be sent;
a field for indicating a latest token consumption time;
a field for indicating an earliest reporting time;
a field for indicating a latest reporting time; and
a field for indicating the number of tokens.

12. The apparatus of claim 11, wherein when a token moved from another terminal is stored in the SRM, the token management module is further configured to acquire the token which was moved from the terminal and stored in the SRM.

13. The apparatus of claim 12, wherein the token management module is further configured to:
  send a token information request message to the SRM through the communication module to determine a type of a token stored in the SRM,
  acquire information about the type of the token stored in the SRM, from the SRM through a token information response message,
  send a request for a token desired by the terminal to the SRM through a token consumption request message, and
  receive the requested token from the SRM through a token consumption response message.

14. The apparatus of claim 13, wherein the token information response message includes at least one of:
  an RI ID field for indicating an RI that issued the token,
  a service ID/program ID field for indicating whether the token is available only for a specific service/program,
  a moveable field for indicating whether the token is available in another terminal, or
  a token quantity field for indicating a number of tokens designated by the token information response message, among tokens stored in the SRM.

15. The apparatus of claim 13, wherein the token consumption request message includes at least one of:
  an RI ID field for indicating a specific RI when the terminal intends to use a token issued by the specific RI,
  a service ID/program ID field for indicating a specific service/program when the terminal intends to use a token available in the specific service/program, or
  a Domain ID field for indicating a specific domain when the terminal is a member of the specific domain and the SRM has a token corresponding to an ID of the specific domain.

16. The apparatus of claim 13, wherein the token consumption response message includes at least one of:
  an RI ID field for indicating an RI that issued a token that the terminal requested through the token consumption request message,
  a service ID/program ID field for indicating a specific service/program for which a token is available that the terminal requested through the token consumption request message,
  a moveable field for indicating whether a token included in the token consumption response message can be moved to another terminal, or
  a domain ID field for indicating whether the token can be shared among members of a specific domain.

17. The apparatus of claim 11, wherein when the token was used for playback of at least one of a service or a content, the token management module is further configured to send a token reporting request message including information about a number of consumed tokens to the RI through the communication module.

18. The apparatus of claim 17, wherein the token reporting request message includes at least one of:
  an RI ID field for identifying the RI,
  a service ID/program ID field for indicating a specific service/program for which the token was used,
  a tokens consumed field for indicating information about a number of consumed tokens,
  a domain ID field for indicating a specific domain when the token belongs to the specific domain,
  a target ID field for indicating an ID of at least one of an SRM or another terminal to which the token was moved, or
  a token moved field for indicating a number of tokens moved to at least one of another terminal or the SRM.

19. An apparatus for managing tokens for digital rights management, the apparatus comprising:
  a secure removable media (SRM) agent configured to receive at least one token acquired from a rights issuer (RI) from a first terminal through a token installation request message; and
  a storage configured to store the acquired token,
  wherein the token can be shared by several terminals, and
  wherein the token installation request message includes:
    a field for indicating a token issuer;
    a field for indicating a service/programs for which the token can be used;
    a field for indicating whether the token can be moved to another terminal;
    a field for indicating whether the token can be shared among members of a specific domain;
    a field for indicating that a token consumption must be reported and defining a uniform resource locator (URL) to which a tokenconsumptionreport message should be sent;
    a field for indicating a latest token consumption time;
    a field for indicating an earliest reporting time;
    a field for indicating a latest reporting time; and
    a field for indicating the number of tokens.

20. The apparatus of claim 19, wherein the SRM agent is further configured to deliver the token to a second terminal, when the SRM is inserted into the second terminal and a request for information about the token is received from the second terminal.

21. The apparatus of claim 20, wherein the SRM agent is further configured to:
  receive a token information request message from the second terminal to determine a type of a token stored in the SRM,
  send information about the type of the token stored in the SRM to the second terminal through a token information response message,
  receive a request for a token desired by the second terminal through a token consumption request message, and
  deliver the requested token to the second terminal through a token consumption response message.

* * * * *